(12) United States Patent
Katsuta

(10) Patent No.: US 10,674,013 B2
(45) Date of Patent: Jun. 2, 2020

(54) EXCHANGE, CALL FACILITATION METHOD, AND CALL FACILITATION PROGRAM

(71) Applicant: NEC Platforms, Ltd., Kawasaki-shi, Kanagawa (JP)

(72) Inventor: Kazuki Katsuta, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 16/094,230

(22) PCT Filed: Jun. 12, 2017

(86) PCT No.: PCT/JP2017/021629
§ 371 (c)(1),
(2) Date: Oct. 17, 2018

(87) PCT Pub. No.: WO2017/221757
PCT Pub. Date: Dec. 28, 2017

(65) Prior Publication Data
US 2019/0098131 A1    Mar. 28, 2019

(30) Foreign Application Priority Data

Jun. 20, 2016 (JP) .................................. 2016-121808

(51) Int. Cl.
*H04M 3/42* (2006.01)
*H04M 3/436* (2006.01)
(Continued)

(52) U.S. Cl.
CPC ............. *H04M 3/436* (2013.01); *H04M 3/02* (2013.01); *H04M 3/4285* (2013.01);
(Continued)

(58) Field of Classification Search
CPC ..... H04M 3/436; H04M 3/02; H04M 3/42238
(Continued)

(56) References Cited

U.S. PATENT DOCUMENTS 4,310,723 A * 1/1982 Svala ....................... H04Q 5/24
379/180
4,436,962 A * 3/1984 Davis .................... H04M 3/546
379/207.03

(Continued)

FOREIGN PATENT DOCUMENTS

JP     60-165193 A    8/1985
JP     61-035093 A    2/1986
(Continued)

OTHER PUBLICATIONS

International Search Report of PCT/JP2017/021629 filed Jul. 11, 2017.
(Continued)

*Primary Examiner* — William J Deane, Jr.
(74) *Attorney, Agent, or Firm* — Sughrue Mion, PLLC

(57) ABSTRACT

Control means of an exchange comprising connection means for accommodating a telephone and the control means for controlling the accommodated telephone, receives a dial signal from the telephone without causing the telephone to respond to an incoming call when the telephone that is performing incoming call ringing is hooked off, causes the hooked-off telephone to respond to the incoming call when the received dial signal is a first dial signal, and causes the telephone as a call source to make a call without causing the hooked-off telephone to respond to the incoming call when the received dial signal is a second dial signal. Thereby, it is possible to make a call even during incoming call ringing.

10 Claims, 2 Drawing Sheets

(51) Int. Cl.
*H04Q 3/58* (2006.01)
*H04M 3/02* (2006.01)
*H04M 19/04* (2006.01)
*H04Q 3/62* (2006.01)
*H04M 9/02* (2006.01)
*H04M 3/428* (2006.01)

(52) U.S. Cl.
CPC ... *H04M 3/42314* (2013.01); *H04M 3/42323* (2013.01); *H04M 9/02* (2013.01); *H04M 19/041* (2013.01); *H04Q 3/58* (2013.01); *H04Q 3/625* (2013.01); *H04M 3/42238* (2013.01)

(58) Field of Classification Search
USPC ............ 379/207.06, 201.01, 207.03, 204.01, 379/390.02
See application file for complete search history.

(56) References Cited

U.S. PATENT DOCUMENTS

| | | | | |
|---|---|---|---|---|
| 5,090,052 | A * | 2/1992 | Nakajima | H04M 1/723 370/295 |
| 5,150,399 | A * | 9/1992 | Yasuda | H04M 3/487 379/143 |
| 6,985,573 | B2 * | 1/2006 | Fang | H04M 7/006 379/201.12 |
| 8,577,011 | B1 * | 11/2013 | Madabhushi | H04M 3/42212 379/211.02 |
| 8,938,057 | B1 * | 1/2015 | Zhang | H04M 3/42212 379/211.02 |
| 2002/0064275 | A1 * | 5/2002 | Tatsumi | H04M 3/46 379/229 |
| 2006/0072546 | A1 * | 4/2006 | Chen | H04L 29/06027 370/352 |
| 2009/0097626 | A1 * | 4/2009 | McMurry | H04L 12/66 379/201.01 |
| 2011/0019808 | A1 * | 1/2011 | Metz | H04M 3/46 379/142.06 |

FOREIGN PATENT DOCUMENTS

| | | |
|---|---|---|
| JP | 05-227305 A | 9/1993 |
| JP | 10-327243 A | 12/1998 |
| JP | 2000-244658 A | 9/2000 |
| JP | 2008-118398 A | 5/2008 |
| JP | 2009-177249 A | 8/2009 |
| JP | 2014-216899 A | 11/2014 |

OTHER PUBLICATIONS

Japanese Notification of Reasons for Refusal of JP 2016-121808 filed Mar. 27, 2018.
Japanese Notification of Reasons for Refusal of JP 2016-121808 filed Jul. 4, 2017.

* cited by examiner

EXCHANGE, CALL FACILITATION METHOD, AND CALL FACILITATION PROGRAM

CROSS REFERENCE TO RELATED APPLICATIONS

This application is a National Stage of International Application No. PCT/JP2017/021629 filed Jun. 12, 2017, claiming priority based on Japanese Patent Application No. 2016-121808 filed Jun. 20, 2016, the contents of all of which are incorporated herein by reference in their entirety.

TECHNICAL FIELD

The present invention relates to an exchange, a call facilitation method and a call facilitation program which perform processing related to a telephone.

BACKGROUND ART

A telephone device such as a private branch exchange to be connected with a public line network is generally installed to accommodate a plurality of analog telephones to be used as extension telephones in this telephone device. Furthermore, this telephone system is controlled by the telephone device so as to realize an outside line call via a public telephone network and an extension line call between extension telephones.

Described hereinafter is an operation for a case in which an incoming call is received by this telephone system on an outside line.

When an outside line incoming call occurs, the telephone device outputs a call signal to each analog telephone accommodated therein. Each analog telephone, having received the call signal, enters an incoming call ringing state.

For example, each analog telephone, having entered the incoming call ringing state, rings a ringtone and flashes an LED (light emitting diode) indicating the occurrence of the incoming call to notify a user of each analog telephone of the incoming call.

Each user, having detected the incoming call based on this notification, takes a receiver of the analog telephone off hook. Accordingly, the telephone device connects the analog telephone, which is in the hooked-off state, and a telephone which is the source of the incoming call thereby realizing a call enabled state. That is, the analog telephone is taken off hook ("hooked off") to respond to an outside line incoming call.

Thus, when an analog telephone, accommodated in the telephone device, is taken off hook when an incoming call cause the analog telephone to ring in response to the call signal, the analog telephone makes an immediate response. Therefore, the analog telephone cannot perform a calling operation during a state when it is ringing. In this case, to perform a calling operation, a user has needed to wait for another user to respond to the incoming call by using another analog telephone or wait for the call source to stop calling.

Therefore, for example, it is inconvenient for users who make frequent calls and have little occasion to respond to an outside line incoming call for business, to use such a telephone device.

In view of this point, a plurality of analog telephones accommodated in a private branch exchange need to be installed by being grouped as i) analog telephones which ring in response to an incoming call, and ii) analog telephones which are not allowed to ring in response to an incoming call, in order to allow the above described users who make frequent calls to use the analog telephones to make out going calls.

Alternatively, it has been necessary to make settings in advance similar to those in a technique disclosed in Patent Literature 1. More specifically, it has been necessary to make settings of linking in advance a call number of an outside line incoming call and an extension line number of a person who deals with this call number and causing only a telephone of the extension line number of the person who deals with the call number of the outside line incoming call to ring when there is actually an outside line incoming call (see Patent Literature 1).

CITATION LIST

Patent Literature

Patent Literature 1: Japanese Patent Publication No. 2014-216899

SUMMARY OF INVENTION

Technical Problem

By installing the telephones which do not perform incoming call ringing, as described above, and making the settings in advance similar to those in the technique disclosed in Patent Literature 1, it is possible to cause some telephones not to ring even when an outside line incoming call is received. Consequently, for users of such telephones, it is possible to solve the above problem that a call cannot be made when an incoming call is received.

However, if all installed telephones are set to not ring in response to an incoming call, nobody notices the incoming call, and therefore some telephones need to be set to perform, without fail, incoming call ringing. Ringing sounds of other telephones cannot be heard, and therefore if telephones installed at places apart from the other telephones are not set to perform incoming call ringing without fail, nobody can notice an incoming call and make a response.

Therefore, if these telephones are taken off hook during incoming call ringing, these telephones make immediate responses, and therefore it is not possible to solve the problem in which an analog telephone cannot perform a calling operation during ringing.

It is therefore an object of the present invention to provide an exchange, a call facilitation method and a call facilitation program which can make a call even during incoming call ringing.

Solution to Problem

According to a first aspect of the present invention, an exchange is provided, the exchange comprising: connection means for accommodating a telephone; and control means for controlling the accommodated telephone, wherein the control means receives a dial signal from the telephone without causing the telephone to respond to an incoming call when the telephone that is performing incoming call ringing is hooked off, causes the hooked-off telephone to respond to the incoming call when the received dial signal is a first dial signal, and causes the telephone as a call source to make a call without causing the hooked-off telephone to respond to the incoming call when the received dial signal is a second dial signal.

According to a second aspect of the present invention, a call facilitation method is provided, the call facilitation method performed by an exchange, the exchange comprising connection means for accommodating a telephone and control means for controlling the accommodated telephone, the call facilitation method comprising, at the control means, receiving a dial signal from the telephone without causing the telephone to respond to an incoming call when the telephone that is performing incoming call ringing is hooked off, causing the hooked-off telephone to respond to the incoming call when the received dial signal is a first dial signal, and causing the telephone as a call source to make a call without causing the hooked-off telephone to respond to the incoming call when the received dial signal is a second dial signal.

According to a third aspect of the present invention, a call facilitation program is provided, the call facilitation program causing a computer to function as an exchange, the computer comprising connection means for accommodating a telephone and control means for controlling the accommodated telephone, the call facilitation program causing the control means as control means for receiving a dial signal from the telephone without causing the telephone to respond to an incoming call when the telephone that is performing incoming call ringing is hooked off, causing the hooked-off telephone to respond to the incoming call when the received dial signal is a first dial signal, and causing the telephone as a call source to make a call without causing the hooked-off telephone to respond to the incoming call when the received dial signal is a second dial signal.

Advantageous Effects of Invention

According to the present invention, it is possible to make a call even during incoming call ringing.

DESCRIPTION OF EMBODIMENTS

First, an outline of the embodiment of the present invention will be described. The embodiment of the present invention provides a function of enabling selection of a response or a call when an analog telephone terminal accommodated in a private branch exchange is taken off hook during incoming call ringing in response to a call signal. Furthermore, the selecting operation enables a calling operation to be performed instead of performing an incoming call response, so that a terminal installed to respond to an incoming call can perform a calling operation even when the terminal is in a ringing state. The outline of the embodiment of the present invention has been described above.

Next, the embodiment of the present invention will be described in detail with reference to the drawings.

Figure 1:
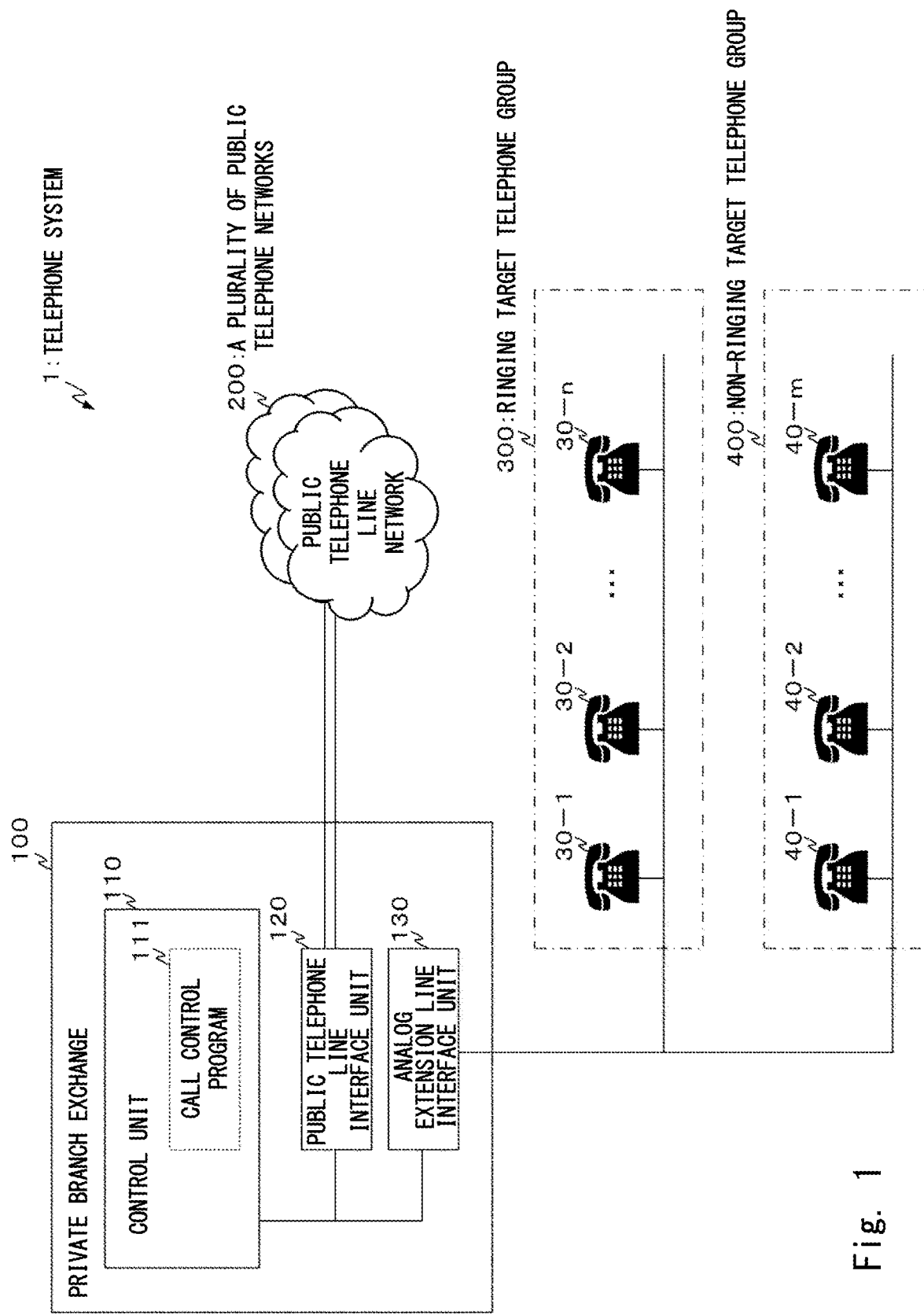
FIG. 1 is a view illustrating a basic configuration of an overall embodiment of the present invention.

First, an entire configuration of a telephone system 1 according to the present embodiment will be described with reference to FIG. 1. As illustrated in FIG. 1, the telephone system 1 includes a private branch exchange 100, a plurality of public telephone networks 200, a plurality of telephones 30 and a plurality of telephones 40.

The private branch exchange 100 is a private branch exchange which has a function of a normal telephone exchange and, in addition, a function unique to the present embodiment. In addition, the private branch exchange 100 is realized by, for example, equipment called a private branch exchange, a PBX (Private Branch eXchange) or a button telephone main device.

Furthermore, the private branch exchange 100 includes a control unit 110, a public telephone line interface unit 120 and an analog extension line interface unit 130. Furthermore, the private branch exchange 100 is connected with the plurality of public telephone networks 200 via the public telephone line interface unit 120. Furthermore, the private branch exchange 100 is connected with the plurality of telephones 30 and the plurality of telephones 40 via the analog extension line interface unit 130.

The control unit 110 is a unit which controls the entire private branch exchange 100. A call control program 111 operates on the control unit 110 to realize this control.

More specifically, the control unit 110 includes a computation processing device such as a CPU (Central Processing Unit) and a storage device such as a ROM (Read Only Memory) which stores various control programs such as an OS (Operating System) and the call control program 111 and a RAM (Random Access Memory) which stores data which is temporarily necessary for the CPU to execute the programs. Furthermore, while the CPU reads the OS or the various control programs such as the call control program 111 from the ROM, and expands the read OS or control program such as the call control program 111 to the RAM, the control unit 110 performs computation processing based on these OS and various control programs such as the call control program 111. Furthermore, the control unit 110 controls hardware in the private branch exchange 100 based on a computation result to realize the function of the private branch exchange 100. That is, the private branch exchange 100 can be realized by collaboration of the hardware and software.

For example, the call control program 111 transmits and receives signals between the plurality of telephones 30 and the plurality of telephones 40 via the analog extension line interface unit 130. Furthermore, the call control program 111 transmits and receives signals between telephones connected to the plurality of public telephone networks 200 via the public telephone line interface unit 120 and other exchanges included in the plurality of public telephone networks 200. These operations are realized by a function of a common exchange. However, the private branch exchange 100 according to the present embodiment performs such a common operation and, in addition, an operation unique to the present embodiment. This point will be described below with reference to a flowchart in FIG. 2.

The plurality of telephones 30 and the plurality of telephones 40 which are call control targets of the private branch exchange 100 are analog telephones. The plurality of telephones 30 and the plurality of telephones 40 make an outside line call or an extension line call in response to switch of a route by the private branch exchange 100.

Furthermore, when dial buttons of the plurality of telephones 30 and the plurality of telephones 40 are pushed, dial signals corresponding to the pushed dial buttons are output to the private branch exchange 100. In addition, the dial buttons include numeric keys for inputting telephone numbers and a key such as "#".

In this regard, the private branch exchange 100 sets a telephone 30-1, a telephone 30-2 and a telephone 30-$n$ ($n$ is an optional natural number) to ring (i.e., perform incoming call ringing) during incoming calls from the plurality of public telephone networks 200. More specifically, the private branch exchange 100 outputs call signals to the telephone 30-1, the telephone 30-2 and the telephone 30-n during the incoming calls from the plurality of public telephone networks 200. Furthermore, the telephone 30-1, the telephone 30-2 and the telephone 30-n receive these call signals, and perform incoming call ringing based on these received call signals. These telephone 30-1, telephone 30-2 and telephone 30-n will be collectively referred to as a ringing target telephone group 300 below.

On the other hand, the private branch exchange 100 sets a telephone 40-1, a telephone 40-2 and a telephone 40-m (m is an optional natural number) not to ring (i.e., not perform incoming call ringing) during incoming calls from the plurality of public telephone networks 200. More specifically, the private branch exchange 100 does not output call signals to the telephone 40-1, the telephone 40-2 and the telephone 40-m during incoming calls from the plurality of public telephone networks 200. Hence, the telephone 40-1, the telephone 40-2 and the telephone 40-m do not perform the incoming call ringing. These telephone 40-1, telephone 40-2 and telephone 40-m will be collectively referred to as a non-ringing telephone group 400 below.

Figure 2:
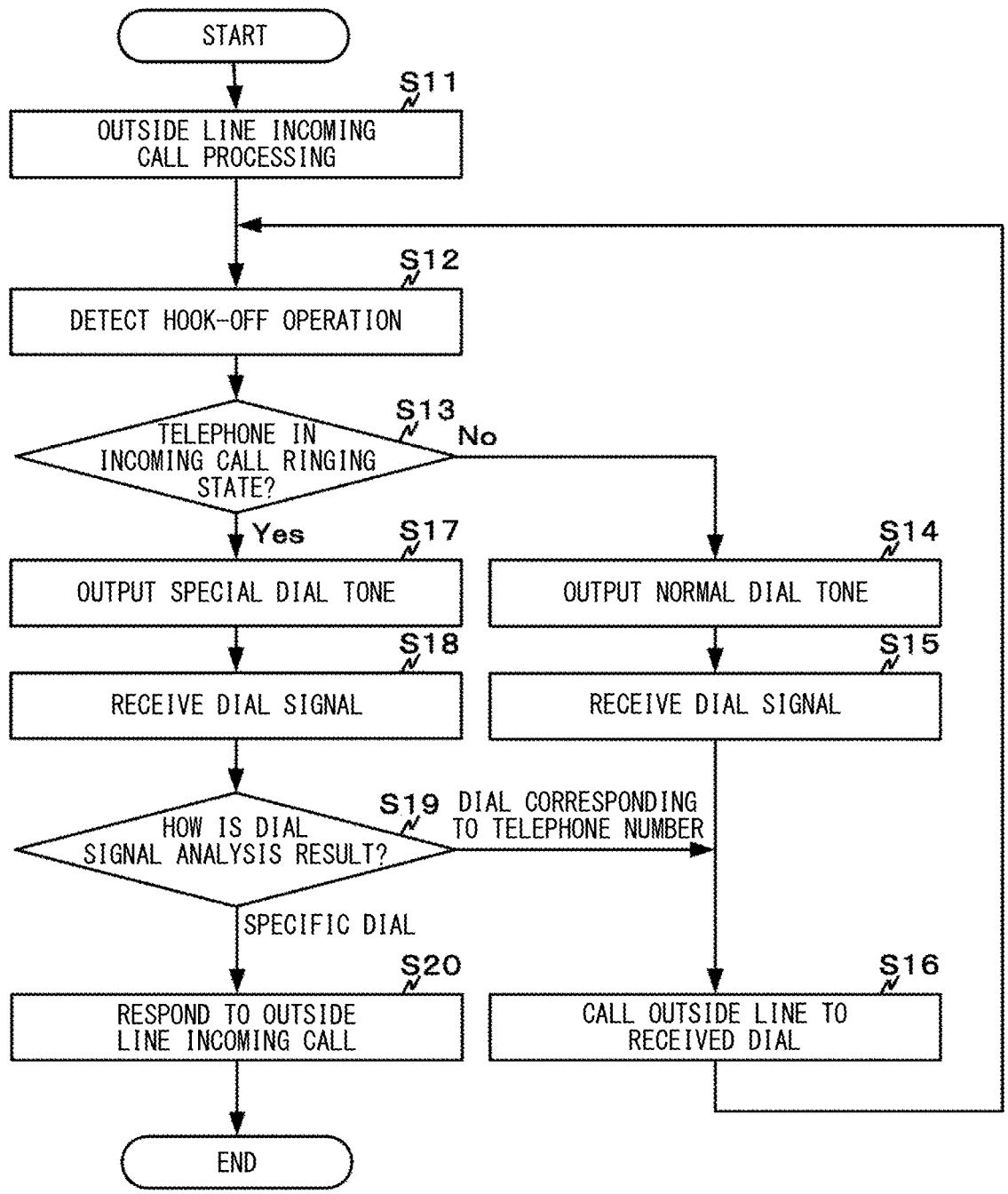
FIG. 2 is a flowchart illustrating a basic operation of an exchange according to the embodiment of the present invention.

Next, an operation processing procedure of the private branch exchange 100 during incoming calls from the plurality of public telephone networks 200 will be described with reference to the flowchart in FIG. 2.

First, when there are outside line incoming calls from the plurality of public telephone networks 200, the private branch exchange 100 performs outside line incoming call processing (step S11). More specifically, call signals are output to the respective telephones 30 included in the ringing target telephone group 300 to cause the respective telephones 30 included in the ringing target telephone group 300 to perform incoming call ringing. Furthermore, a ringback tone is output to a call source of the incoming call.

Next, a hook-off operation, which is a user's operation of lifting a receiver of the some telephone 30 or the some telephone 40 off hook, is detected (step S12).

Next, it is determined whether or not the telephone placed in the hooked-off state by the hook-off operation is a telephone in the incoming call ringing state. In this regard, when the telephone is a telephone in the incoming call ringing state (Yes in step S13), i.e., the telephone is some telephone 30 included in the ringing target telephone group 300, the flow moves to step S17 to perform processing unique to the present embodiment. An example where the telephone is, for example, telephone 30-1 will be described below.

On the other hand, when the telephone is not a telephone in the incoming call ringing state (No in step S13), i.e., when the telephone is some telephone 40 included in the non-ringing telephone group 400, the flow moves to step S14 to perform general call processing. An example where the telephone is, for example, the telephone 40-1 will be described below.

First, call processing subsequent to step S14 will be described. First, the private branch exchange 100 outputs a normal dial tone to the telephone 40-1 in the hooked-off state (step S14). Thus, the receiver of the telephone 40-1 outputs the dial tone. A user of this telephone 40 confirms the dial tone, and then inputs dial information by dialing the call destination telephone number by using the dial buttons.

The telephone 40-1 outputs the inputted dial information as a dial signal to the private branch exchange 100, and then the private branch exchange 100 receives this dial signal (step S15). Furthermore, the private branch exchange 100 calls the dialed telephone (i.e., the telephone number) corresponding to the dial signal received in step S15 assuming that the call source is the telephone 40-1 (step S16). Description of the operation after the call will be omitted. In this regard, a response to an incoming call is not yet made, and therefore the private branch exchange 100 returns to step S12, detects that another telephone is hooked off, and resumes processing. Furthermore, the ringback tone is output to the call source of the incoming call in step S11. However, the ringback tone continues being outputted until step S16, and the ringback tone continues being outputted even after the flow returns to step S13.

In addition, in the present embodiment, the dial signal may be any signal among various signals such as a DTMF (Dual-Tone Multi-Frequency) signal or a pulse signal.

Next, processing subsequent to step S17 will be described. First, the private branch exchange 100 outputs a special dial tone which is a dial tone different from a normal tone output in step S14 to telephone 30-1 in the hooked-off state without performing incoming call response processing on telephone 30-1 in the hooked-off state (step S17). Thus, the receiver of this telephone 30-1 outputs the special dial tone. Upon hearing the special dial tone, which is distinguishable from the normal dial tone, the user can realize that an outside line incoming call is present, and push the dial buttons to initiate different processing.

In this regard, in the present embodiment, subsequent processing differs depending on dial buttons pushed by the user after the special dial tone is outputted.

More specifically, when the user pushes a specific dial button, incoming call response processing is performed. The specific dial button is a button which is not used to input a telephone number, and is, for example, the "# button".

On the other hand, when the user pushes dial buttons corresponding to a telephone number without pushing the specific dial button, processing is performed to place a call to this telephone number. The telephone number in this case is the same as a general telephone number inputted in a case where incoming call ringing is not performed, and is, for example, a telephone number including an area code, such as "0312345678".

Hence, when responding to the incoming call, the user pushes the specific dial button for a pick-up operation. On the other hand, when making a call without responding to the incoming call, the user directly inputs a telephone number by pushing numeric keys included as the dial buttons as a calling operation without pushing the specific dial button.

Either way, the dial signal corresponding to the dial buttons pushed by the user is outputted from the telephone 30-1 to the private branch exchange 100, and then the private branch exchange 100 receives this dial signal (step S18). Furthermore, the private branch exchange 100 analyzes the received dial signal (Step S19). In addition, the ringback tone is output to the call source of the incoming call in step S11. However, the ringback tone continues being output between step S11 and step S19.

In addition, when the dial signal is the specific dial signal (e.g. # button) as a result of analysis (the specific dial in step S20), a response to the outside line incoming call is made. Hence, the private branch exchange 100 connects the incoming call to the telephone 30-1 in the hooked-off state. Thus, the response is made to the outside line incoming call, and then the telephone 30-1 starts calling to the call source telephone. Description of an operation after transition to a call state will be omitted.

On the other hand, when the dial signal is not the specific dial (e.g., # button) as the result of the analysis and dial corresponding to the telephone number (e.g., 0312345678) is received (the dial corresponding to the telephone number in step S20), the flow moves to step S16. Furthermore, the private branch exchange 100 calls the dialed number (i.e., telephone number) as the result of the analysis in step S19, assuming that the call source is the telephone 30-1 (step S16). Description of the operation after the call will be omitted. In this regard, a response to an incoming call is not yet made, and therefore the private branch exchange 100 returns to step S12, detects that another telephone is hooked off, and resumes the processing. Furthermore, the ringback tone is output to the call source of the incoming call in step S11. However, the ringback tone continues being output until step S16, and the ringback tone continues being output even after the processing returns to step S13.

The above-described present embodiment provides an effect that an analog telephone connected to an extension line of the telephone device can make a call without responding to an incoming call even during incoming call ringing. That is, it is possible to improve the operation of the analog telephones accommodated in the private branch exchange.

Furthermore, the present embodiment also provides an effect that it is possible to select whether to respond to an incoming call or to make a call by performing a very simple operation of "pushing a specific dial button" or a "inputting a telephone number as usual".

Furthermore, the above embodiment is a preferred embodiment of the present invention. However, a scope of the present invention is not limited only to the above embodiment, and embodiments variously modified without departing from the gist of the present invention can be carried out. For example, the above embodiment can be modified as in the following modified examples.

First Modified Example

The above description assumes that a call destination telephone number is inputted by one number by one number using numeric keys like "0312345678" without pushing a specific dial button (e.g., # button) to make a call from a telephone which is performing incoming call ringing. However, as long as a so-called speed dial function which enables input of a call destination telephone number by pushing one certain button is provided, this function may be used. That is, by pushing one certain button to which the above speed dial function is allocated without pushing the specific dial button (e.g., # button), the telephone which is performing incoming call ringing may make a call.

Consequently, it is possible to make a user's operation simpler.

Second Modified Example

According to the above description, an outside line call is made in step S16. This outside line call may be modified as an extension line call, for example. In this case, when a call destination is one of the telephones 30 included in the ringing target telephone group 300, incoming call ringing of an outside line incoming call for this telephone 30 is cancelled, and incoming call ringing of an extension line incoming call may be performed.

Consequently, even a telephone which is performing incoming call ringing of the outside line incoming call can receive an extension line incoming call without responding to the incoming call.

Third Modified Example

According to the above description, whether the dial signal is the specific dial or dial numbers corresponding to a telephone number is decided in step S19. In this case, even when the dialed number corresponding to the telephone number are input halfway, if the specific dial button (e.g., # button) is pushed while the telephone number is inputted, the processing may move to step S20.

In this case, a user starts inputting the telephone number trying to make a call. However, even when the user has a change of mind while inputting the telephone number and tries to respond to an incoming call, the user can respond to the incoming call, which is good. Furthermore, even though the user tries to respond to an incoming call, if the user pushes a button other than the specific dial button (e.g., # button) by mistake, the user can respond to the incoming call, which is good.

In addition, the exchange and each telephone included in the above telephone system can be realized by hardware, software or a combination of these. Furthermore, a call facilitation method performed by collaboration of the exchange and each telephone included in the above telephone system can also be realized by the hardware, the software or the combination of these. In this regard, the realization achieved by the software means realization achieved when a computer reads and executes a program.

The program can be stored and provided to a computer using any type of non-transitory computer readable medium. Non-transitory computer readable media include any type of tangible storage medium. Examples of non-transitory computer readable medium include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable medium. Examples of transitory computer readable medium include electric signals, optical signals, and electromagnetic waves. Transitory computer readable medium can provide the program to a computer via a wired communication line, such as electric wires and optical fibers, etc. or a wireless communication line.

The whole or part of the embodiments disclosed above can be described as, but not limited to, the following supplementary notes.

(Supplementary Note 1) An exchange comprising:
connection means for accommodating a telephone; and
control means for controlling the accommodated telephone,
wherein the control means receives a dial signal from the telephone without causing the telephone to respond to an incoming call when the telephone that is performing incoming call ringing is hooked off, causes the hooked-off telephone to respond to the incoming call when the received dial signal is a first dial signal, and causes the telephone as a call source to make a call without causing the hooked-off telephone to respond to the incoming call when the received dial signal is a second dial signal.

(Supplementary Note 2) According to the exchange according to Supplementary Note 1, wherein
the second dial signal is a signal indicating a telephone number for specifying a call destination, and
the control means makes the call to the telephone number as the call destination.

(Supplementary Note 3) According to the exchange according to Supplementary Note 1 or 2, wherein the first dial signal is a signal outputted in response to pushing a button that is not used to input a telephone number in the hooked-off telephone.

(Supplementary Note 4) According to the exchange according to any one of Supplementary Notes 1 to 3, wherein, when receiving the first dial signal even after receiving part of the second dial signal, the control means causes the hooked-off telephone to respond to the incoming call.

(Supplementary Note 5) According to the exchange according to any one of Supplementary Notes 1 to 4, wherein, even when the telephone that is performing the incoming call ringing is hooked off, the control means outputs a ringback tone to a call source of an incoming call to the telephone that is performing the incoming call ringing.

(Supplementary Note 6) According to the exchange according to any one of Supplementary Notes 1 to 5, wherein at least one of a telephone that is a call source of an incoming call to the telephone that is performing the incoming call ringing and the telephone of the call destination of the call is not the accommodated telephone.

(Supplementary Note 7) According to the exchange according to any one of Supplementary Notes 1 to 6, wherein the control means causes some telephones of the accommodated telephones to perform incoming call ringing and does not allow other telephones of the accommodated telephones to perform the incoming call ringing when there is an incoming call, and does not cause the telephone to respond to the incoming call even when the telephone that is not allowed to perform the incoming call ringing is hooked off.

(Supplementary Note 8) According to the exchange according to any one of Supplementary Notes 1 to 7, wherein the control means causes some telephones of the accommodated telephones to perform incoming call ringing and does not allow other telephones of the accommodated telephones to perform the incoming call ringing when there is an incoming call, and varies a dial tone outputted to the telephone when the telephone that is performing the incoming call ringing is hooked off, and a dial tone outputted to the telephone when the telephone that does not perform the incoming call ringing is hooked off.

(Supplementary Note 9) According to the exchange according to any one of Supplementary Notes 1 to 8, wherein the accommodated telephone is an analog telephone.

(Supplementary Note 10) According to the exchange according to any one of Supplementary Notes 1 to 9, the second dial signal is a signal outputted in response to pushing a speed dial.

(Supplementary Note 11) According to the exchange according to any one of Supplementary Notes 1 to 10, wherein the telephone of the call destination of the call is the accommodated telephone.

(Supplementary Note 12) A call facilitation method performed by an exchange, the exchange comprising connection means for accommodating a telephone and control means for controlling the accommodated telephone, at the control means, receiving a dial signal from the telephone without causing the telephone to respond to an incoming call when the telephone that is performing incoming call ringing is hooked off, causing the hooked-off telephone to respond to the incoming call when the received dial signal is a first dial signal, and causing the telephone as a call source to make a call without causing the hooked-off telephone to respond to the incoming call when the received dial signal is a second dial signal.

(Supplementary Note 13) A call facilitation program causing a computer to function as an exchange, the computer comprising connection means for accommodating a telephone and control means for controlling the accommodated telephone, the call facilitation program causing the control means as control means for receiving a dial signal from the telephone without causing the telephone to respond to an incoming call when the telephone that is performing incoming call ringing is hooked off, causing the hooked-off telephone to respond to the incoming call when the received dial signal is a first dial signal, and causing the telephone as a call source to make a call without causing the hooked-off telephone to respond to the incoming call when the received dial signal is a second dial signal.

INDUSTRIAL APPLICABILITY

The present invention is widely suitable to control related to incoming call ringing.

REFERENCE SIGNS LIST 1 telephone system
30,40 telephone
100 private branch exchange
110 control unit
111 call control program
120 public telephone line interface unit
130 analog extension line interface unit
200 a plurality of public telephone networks
300 ringing target telephone group
400 non-ringing target telephone group

The invention claimed is:

1. An exchange comprising:
a memory having stored therein program instructions; and
one or more processors configured to execute the program instructions and when executing the program instructions comprises:
a connection unit configured to accommodate a first plurality of telephones and a second plurality of telephones; and
a control unit configured to control the first plurality of telephones and the second plurality of telephones,
wherein the control unit
causes, when there is an incoming call, the first plurality of telephones, as ringing telephones, to perform incoming call ringing and does not allow the second plurality of telephones, as non-ringing telephones, to perform the incoming call ringing,
outputs a special dial tone to one of the ringing telephones, as an off-hook ringing telephone, when said off-hook ringing telephone is taken off hook, and outputs a normal dial tone to one of the non-ringing telephones, as an off-hook non-ringing telephone, when the off-hook non-ringing telephone is taken off hook,
receives, in a case when the off-hook ringing telephone is taken off hook, a dial signal corresponding to a user operation initiated from the off-hook ringing telephone without causing the off-hook ringing telephone to respond to the incoming call,
causes, in a case when the received dial signal is a first dial signal, the off-hook ringing telephone to respond to the incoming call, and causes, in a case when the received dial signal is a second dial signal, the off-hook ringing telephone to be a call source for making a call based on the received dial signal without causing the off-hook ringing telephone to respond to the incoming call.

2. The exchange according to claim 1, wherein
the second dial signal is a signal indicating a telephone number for specifying a call destination, and
the control unit makes the call to the telephone number as the call destination when the received dial signal is the second dial signal.

3. The exchange according to claim 1, wherein the first dial signal is a signal output in response to pushing a button that is not used to input a telephone number in the off-hook ringing telephone.

4. The exchange according to claim 1, wherein, when receiving the first dial signal even after receiving part of the second dial signal, the control unit causes the off-hook ringing telephone to respond to the incoming call.

5. The exchange according to claim 1, wherein, even when the off-hook ringing telephone is taken off hook, the control unit outputs a ringback tone to a call source of the incoming call to the off-hook ringing telephone.

6. The exchange according to claim 1, wherein at least one of a telephone that is a call source of the incoming call to the off-hook ringing telephone and a telephone of the call destination of the call made when the received dial signal is the second dial signal is not one of the accommodated telephones.

7. The exchange according to claim 1, wherein the control unit
does not cause another one of the non-ringing telephones to respond to the incoming call even when the other one of the non-ringing telephones is taken off hook.

8. The exchange according to claim 1, wherein each of the accommodated telephones is an analog telephone.

9. A call facilitation method performed by an exchange, the exchange comprising a memory having stored therein program instructions, and one or more processors configured to execute the program instructions and when executing the program instructions comprises a connection unit that accommodates a first plurality of telephones, a second plurality of telephones, and a control unit that controls the first plurality of telephones and the second plurality of telephones, the call facilitation method comprising:
at the control unit,
causing, when there is an incoming call, the first plurality of telephones, as ringing telephones, to perform incoming call ringing and does not allow the second plurality of telephones, as non-ringing telephones, to perform the incoming call ringing, and
outputting a special dial tone to one of the ringing telephones, as an off-hook ringing telephone, when said off-hook ringing telephone is taken off hook, and outputting a normal dial tone to one of the non-ringing telephones, as an off-hook non-ringing telephone, when the off-hook ringing telephone is taken off hook,
receiving, in a case when the off-hook ringing telephone is taken off hook, a dial signal corresponding to a user operation initiated from the off-hook ringing telephone without causing the off-hook ringing telephone to respond to the incoming call,
causing, in a case when the received dial signal is a first dial signal, the off-hook ringing telephone to respond to the incoming call, and
causing, in a case when the received dial signal is a second dial signal, the off-hook ringing telephone to be a call source for making a call based on the received dial signal without causing the off-hook ringing telephone to respond to the incoming call.

10. A non-transitory computer-readable medium having stored thereon a call facilitation program that when executed by a computer causes the computer to function as an exchange comprising:
a connection unit that accommodates a first plurality of telephones and a second plurality of telephones, and
a control unit that controls the first plurality of telephones and the second plurality of telephones,
wherein the control unit
causes, when there is an incoming call, the first plurality of telephones, as ringing telephones, to perform incoming call ringing and does not allow the second plurality of telephones, as non-ringing telephones, to perform the incoming call ringing,
outputs a special dial tone to one of the plurality of ringing telephones, as an off-hook ringing telephone, when said off-hook ringing telephone is taken off hook, and outputs a normal dial tone to one of the non-ringing telephones, as an off-hook non-ringing telephone, when the off-hook non-ringing telephone is taken off hook,
receives, in a case when the off-hook ringing telephone is taken off hook, a dial signal corresponding to a user operation initiated from the off-hook ringing telephone without causing the off-hook ringing telephone to respond to the incoming call,
causes, in a case when the received dial signal is a first dial signal, the off-hook ringing telephone to respond to the incoming call, and
causes, in a case when the received dial signal is a second dial signal, the off-hook ringing telephone to be a call source for making a call based on the received dial signal without causing the off-hook ringing telephone to respond to the incoming call.

* * * * *